US008186928B2

(12) United States Patent
Vlad

(10) Patent No.: US 8,186,928 B2
(45) Date of Patent: May 29, 2012

(54) DEVICE AND METHOD FOR ACCOMMODATING AND TRANSPORTING STEPS OF AN ESCALATOR OR PALLETS OF A MOVING WALKWAY

(75) Inventor: René Vlad, Gevelsberg (DE)

(73) Assignee: Kone Corporation, Helsinki (FI)

( * ) Notice: Subject to any disclaimer, the term of this patent is extended or adjusted under 35 U.S.C. 154(b) by 866 days.

(21) Appl. No.: 12/139,791

(22) Filed: Jun. 16, 2008

(65) Prior Publication Data

US 2008/0302278 A1 Dec. 11, 2008

Related U.S. Application Data

(63) Continuation of application No. PCT/DE2006/002007, filed on Nov. 16, 2006.

(30) Foreign Application Priority Data

Dec. 16, 2005 (DE) ........................ 10 2005 060 220

(51) Int. Cl.
*B65G 1/00* (2006.01)

(52) U.S. Cl. ...................................................... 414/276

(58) Field of Classification Search ............... 108/55.11, 108/52.1, 55.1, 55.3, 55.5; 198/333; 414/278, 414/285, 386, 331.09, 331.02, 276
See application file for complete search history.

(56) References Cited

U.S. PATENT DOCUMENTS

| | | | | | |
|---|---|---|---|---|---|
| 1,932,955 | A | * | 10/1933 | Coppinger | 414/809 |
| 3,547,282 | A | * | 12/1970 | Hartbauer et al. | 414/266 |
| 4,613,270 | A | * | 9/1986 | Konstant et al. | 414/276 |
| 4,687,404 | A | * | 8/1987 | Seiz et al. | 414/276 |
| 5,538,384 | A | * | 7/1996 | Haldimann | 414/286 |
| 5,617,961 | A | * | 4/1997 | Konstant et al. | 211/151 |
| 5,642,976 | A | * | 7/1997 | Konstant | 414/276 |
| 5,697,487 | A | * | 12/1997 | Engelke et al. | 198/333 |
| 5,810,541 | A | * | 9/1998 | Casey et al. | 414/401 |
| 5,820,327 | A | * | 10/1998 | Yamaguchi et al. | 414/286 |
| 6,431,378 | B1 | * | 8/2002 | Lewis | 211/151 |
| 6,851,562 | B2 | * | 2/2005 | Gorniak et al. | 211/59.2 |
| 7,140,503 | B2 | * | 11/2006 | Krummell et al. | 211/151 |
| 7,604,108 | B2 | * | 10/2009 | Gonzalez Alemany et al. | 198/330 |

FOREIGN PATENT DOCUMENTS

| | | | | |
|---|---|---|---|---|
| EP | 362467 | A1 | * | 4/1990 |
| EP | 1 072 552 | A1 | | 1/2001 |
| GB | 235021 | | | 6/1925 |
| JP | 1-139494 | | | 5/1989 |
| JP | 10 291774 | A | | 11/1998 |
| JP | 2003 040570 | A | | 2/2003 |

OTHER PUBLICATIONS

International Search Report, dated Feb. 21, 2007, issued in counterpart application PCT/DE2006/002007.

* cited by examiner

*Primary Examiner* — Jose V Chen
(74) *Attorney, Agent, or Firm* — Venable LLP; Robert Kinberg; Ryan M. Flandro

(57) ABSTRACT

An accommodating and transport device for prefabricated steps of an escalator which are reduced in terms of their overall height or prefabricated pallets of a moving walkway includes a frame body separate and independent of the escalator or moving walkway. The frame body includes lateral guide tracks to receive rollers connected to the steps or pallets. The steps or pallets are stackable inside the frame body for transport purposes.

14 Claims, 4 Drawing Sheets

DEVICE AND METHOD FOR ACCOMMODATING AND TRANSPORTING STEPS OF AN ESCALATOR OR PALLETS OF A MOVING WALKWAY

CROSS-REFERENCE TO RELATED APPLICATIONS

The present application is a continuation of PCT Application No. PCT/DE2006/002007, filed Nov. 16, 2006, designating the United States and claiming priority from German Application No. DE 10 2005 060220.7, filed Dec. 16, 2005, the disclosures of both applications being incorporated herein by reference in their entirety.

SUMMARY

The invention relates to an accommodating and transport device for prefabricated steps of an escalator which are reduced in terms of their overall height or prefabricated pallets of moving walkway.

For the purpose of passenger transport, escalators or moving walkways comprise a plurality of steps or pallets that are assembled to form a band. Such steps or pallets are often integrally manufactured by aluminium injection moulding. Pallets are flat with respect to steps. But if steps of escalators are made of several parts and are provided in a collapsible manner, it is possible to provide the steps with a reduced overall height, similar to the height of a pallet.

Hitherto, steps and pallets packed individually, or together with a plurality of steps or pallets, respectively, have been delivered to the respective building site and usually inserted individually into the frame of the escalator or moving walkway. The transport and mounting in this manner requires relatively labor intensive and is thus costly.

Great Britain Patent document GB-A 2355021 discloses a moving walkway comprising a plurality of pallets that are arranged one after the other and connected by shafts. The thus formed pallet band can be folded or also rolled up for transport purposes. The folding of a pallet band in this manner is complicated and possibly could damage individual pallets.

BACKGROUND

It is an object of the invention to solve the above described problem and to provide an accommodating and transport device, by which the transport, on the one hand, and the assembling, on the other hand, of steps of an escalator having a reduced overall height or pallets of a moving walkway can be simplified.

Furthermore, it is an aim of the subject of invention to provide a method for accommodating, transporting as well as taking out steps of an escalator having a reduced overall height, or pallets of a moving walkway, by which method a simplified storage of such steps or pallets for transport purposes will be possible and simultaneously a simplified assembling method of such steps or pallets can be achieved.

The above and other objects may be achieved in accordance with the invention, by which there is provided, in one embodiment, an accommodating and transport device for prefabricated steps of an escalator which are reduced in terms of their overall height or prefabricated pallets of a moving walkway, comprising a frame body including lateral guide tracks for receiving rollers connected to the steps or pallets, wherein the steps or pallets are stackable inside the frame body for transport purposes.

According to another aspect of the invention, there is provided a method for accommodating and transporting prefabricated steps of an escalator that have a reduced overall height or prefabricated pallets of a moving walkway, comprising: connecting individual steps or pallets to at least one drive element to form a step or pallet band; and inserting the step or pallet band into a frame body comprising guide tracks for the steps or pallets, such that the individual steps or pallets are stacked within the frame body closely adjacent to each other.

According to a further embodiment, the method includes guiding the step or pallet band out of the frame body and inserting the step or pallet band into a base body of the escalator or the moving walkway in an assembly area of the escalator or moving walkway.

Accordingly, there is provided an accommodating and transport apparatus that can advantageously accommodate all the steps and pallets required for an escalator or a moving walkway. In comparison to known techniques, the apparatus of the present invention can accommodate a plurality of folded steps or pallets and allow the erecting engineers at the site of installation to insert the step or pallet band in one piece into the respective frame body.

According to a further embodiment, rollers located laterally of the steps or pallets are guided in the lateral guide tracks of the frame body, wherein the folded steps or pallets are provided in a vertical hanging position.

According to another embodiment, the folded steps or pallets are respectively connected to at least one laterally arranged drive element, in particular a drive chain, such that the distance of the individual steps or pallets is defined.

According to still a further embodiment, the threading of the individual steps or pallets in the area of the upper guide track of the frame body, may be facilitated by the provision of a ramp that extends with a predetermined inclination angle from the upper guide track into the direction of the lower guide track.

The preassembled step or pallet band may be placed in the accommodating and transport device according to the invention, by supplying the individual steps or pallets in an essentially horizontal direction and subsequently turned over the ramp into the vertical direction. This measure permits forming a space saving transport mechanism.

Advantageously, a complete set of steps or pallets is provided for each escalator or each moving walkway, which set will be covered, according to another aspect of the invention, with a film, in particular a shrink film after storage in the workshop.

BRIEF DESCRIPTION OF THE DRAWINGS

The subject of invention is represented in the drawing by AN embodiment and described as follows.

DETAILED DESCRIPTION

Figure 1:
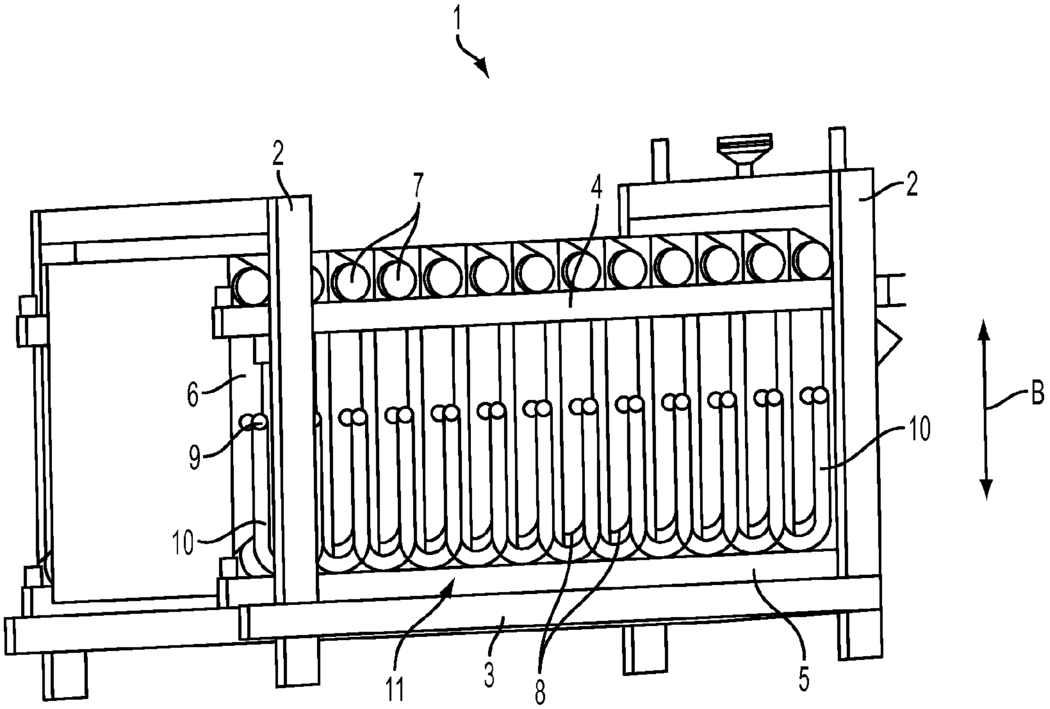
FIG. 1 is a perspective rear-side view of an accommodating and transport device in the stored condition according to an embodiment of the invention.
Figure 2:
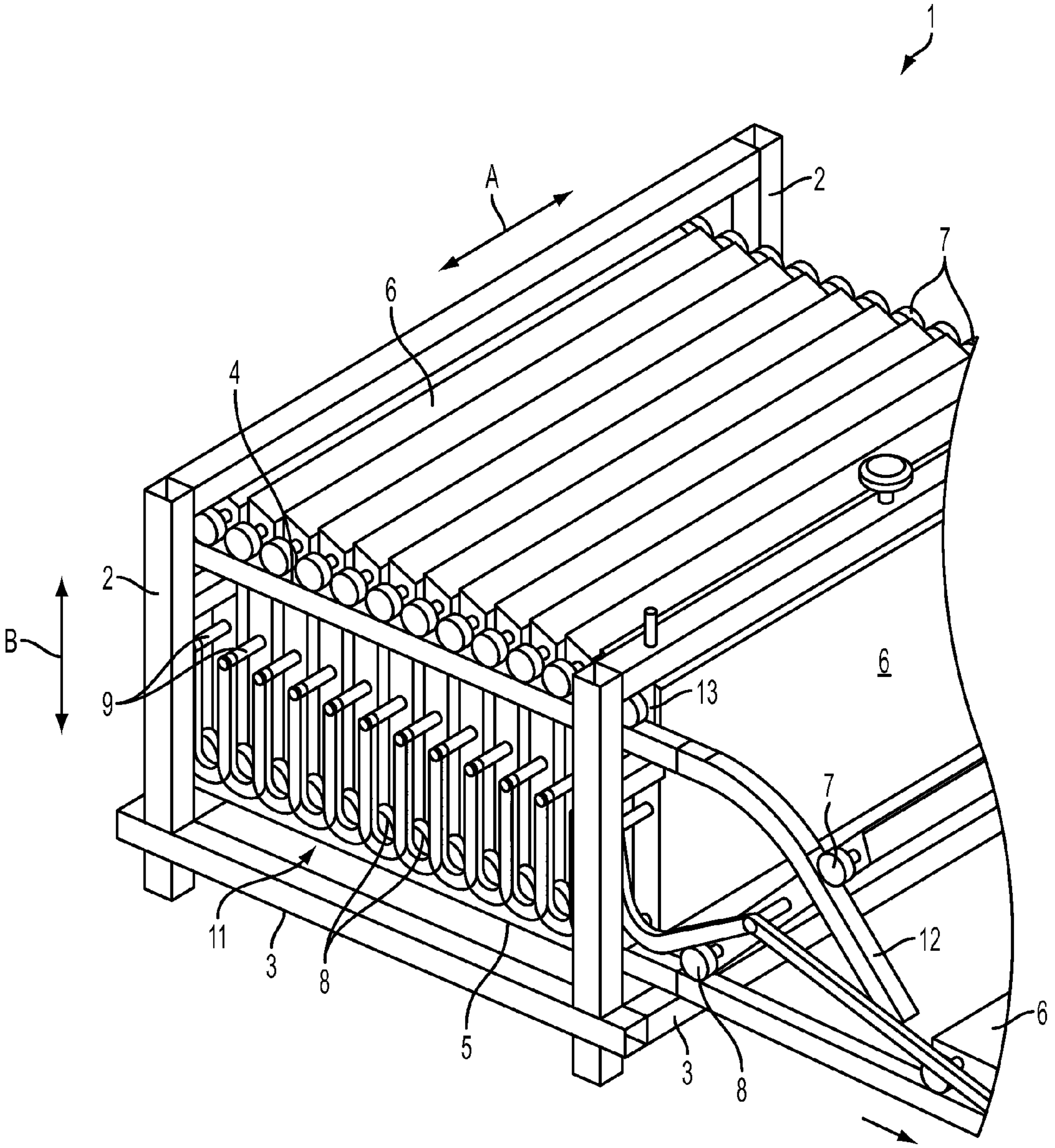
FIGS. 2 to 4 show different, partial perspective representations of the accommodating and transport device of FIG. 1 in a different states of de-storing pallets.
Figure 3:
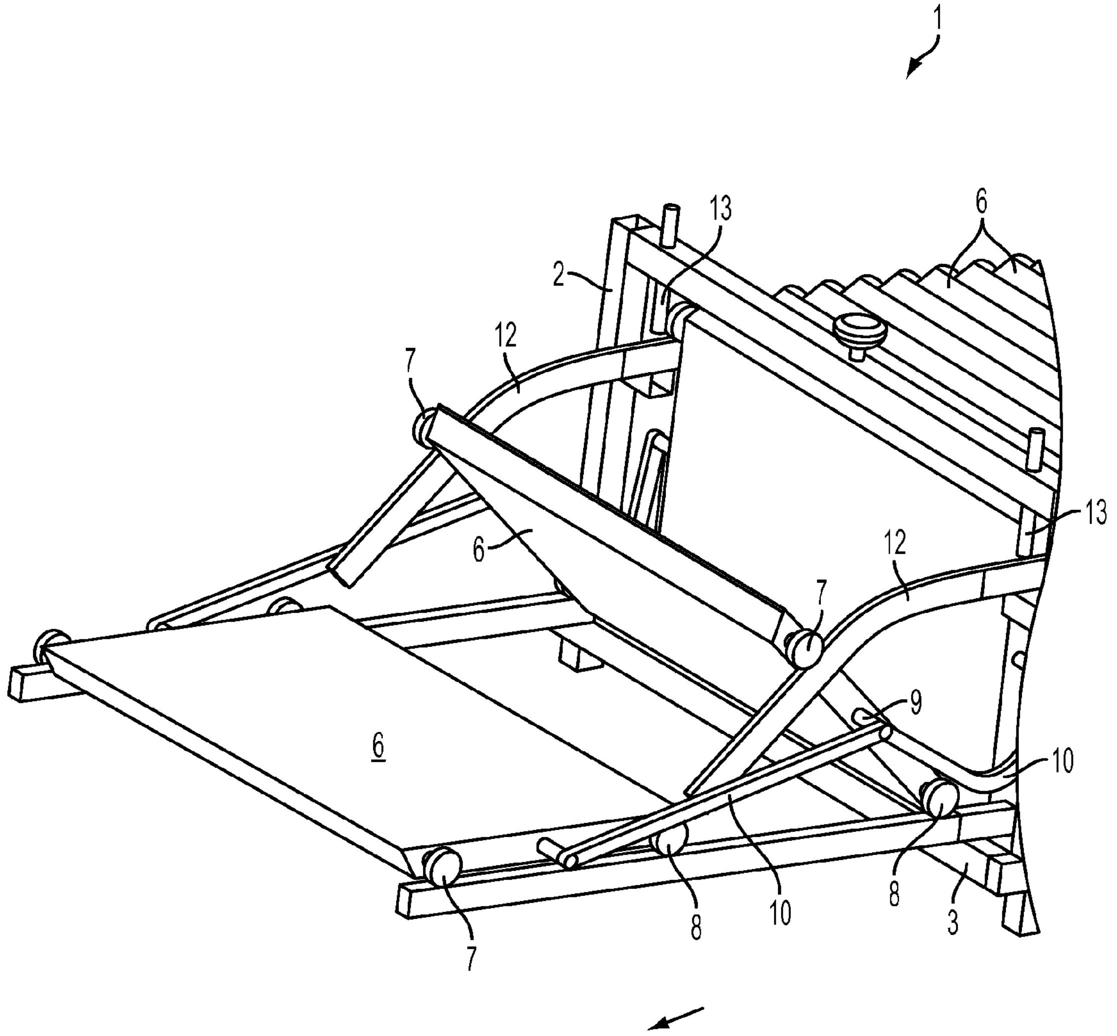
Figure 4:
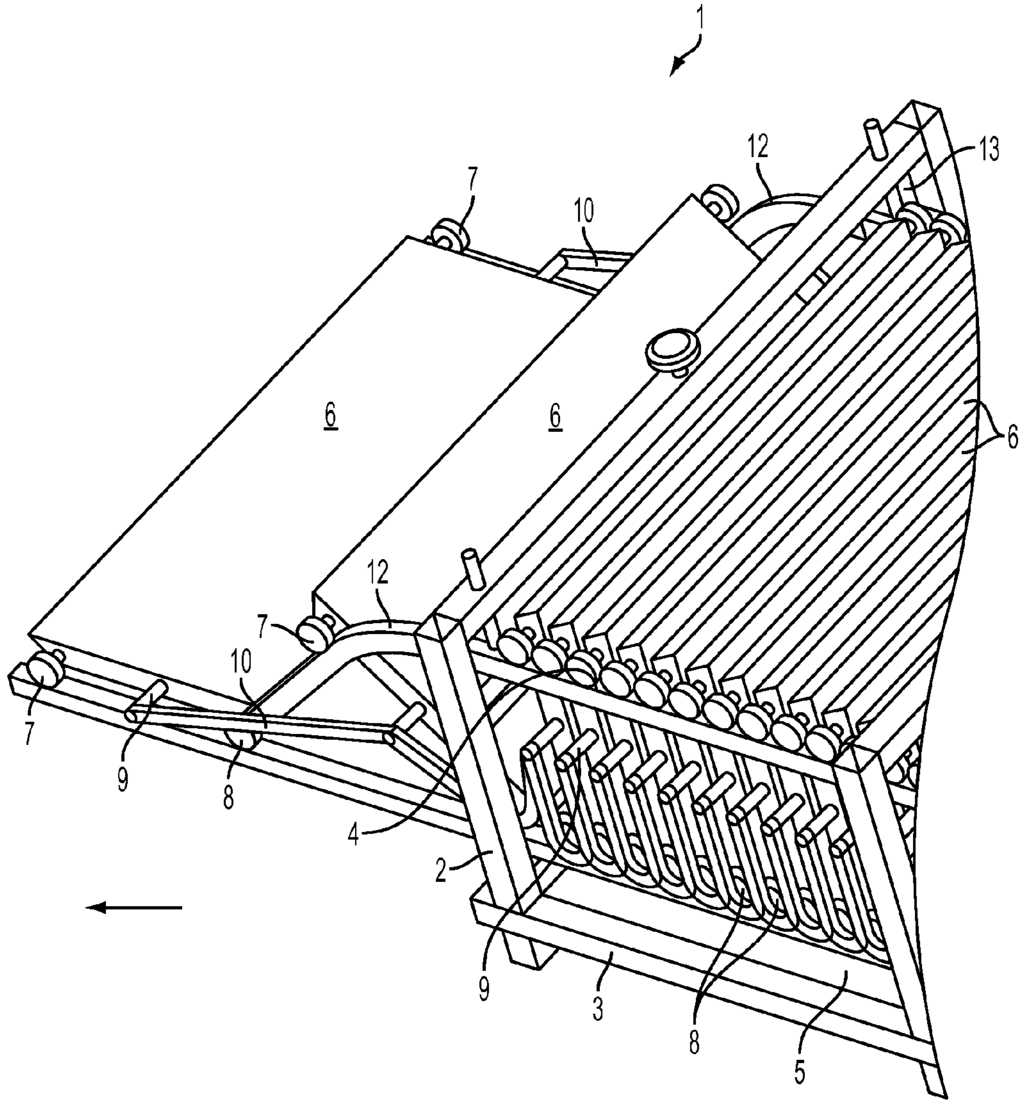

FIGS. 1 through 4 show an embodiment of an accommodating and transport device according to the invention formed by a frame body 1. In this embodiment, the frame body 1 includes coated steel profiles 2, 3. The steel profiles 2 extend in the vertical direction, whereas the steel profiles 3 are provided in the horizontal direction and connected to the profiles 2. In the area of the profiles 2, 3, respectively two lateral guide tracks 4, 5 are positioned one over the other in a vertical direction with a predetermined spacing. In the present embodiment, pallets 6 of a non-represented moving walkway are placed in the frame body 1 according to the invention. But this is also true for steps of an escalator which have been reduced in overall height. FIG. 1 shows the stored condition of the pallets 6, whereas the FIGS. 2 through 4 represent the de-storing condition (arrow). As represented, the pallets 6 are provided with lateral rollers 7, 8. In the area of each pallet 6, a coupling point 9 for receiving a chain link 10 of a drive chain 11 is provided.

As shown, the upper guide track 4 receives the rollers 7 and the lower guide track 5 receives the rollers 8 of the individual pallets 6.

A ramp 12 forms a supply and discharge area for allowing the rollers 7 to be inserted into the area of the upper guide track or to be removed from there. As indicated schematically in FIGS. 1 and 2, the lateral distance of the horizontal profiles 3 and the height distance of the upper and lower guide track 4, 5 are adjustable (see bi-directional arrows A and B, respectively) in order to take different pallet geometries into account.

Advantageously, one complete set of pallets 6 is stored for each transport device 1 (FIG. 1) which can then be de-stored, as represented in FIGS. 2 through 4, and be inserted as a band continuum into the no further represented frame of a moving walkway.

For the purpose of insertion and transport of the pallets 6, at least one stop element 13 is provided in the area of the frame body on the side of the ramp, which stop element prevents the pallets 6 from unintentionally sliding out of the accommodating and frame body 1.

The method of the invention proceeds as follows:

Outside the frame body 1, the steps of an escalator having a reduced overall height or pallets 6 are actively connected to a drive chain 11 in the area of their coupling points 9. The thus formed step or pallet band is subsequently inserted into the frame body 1 via the ramp 12 as well as the guide tracks 4, 5, so that the pallets 6 are arranged in a hanging position in the frame body. Accordingly, as small a distance as possible between individual pallets 6 is achieved. The stop element 13 is activated when the complete pallet set for the equipment of a moving walkway is inserted into the frame body 1 so that an unintentional sliding of pallets 6 out of the frame body 1 will be prevented. In this intermediate storage condition, the pallet band can be brought to the respective assembly site of the moving walkway. The pallets 6 or the pallet band are guided out of the frame body 1 and threaded into a no further represented base body of a moving walkway via the guide tracks 4, 5 and the ramp 12.

The invention has been described in detail with respect to various embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. An accommodating and transport device for a prefabricated step band of an escalator or a prefabricated pallet band of a moving walkway, the accommodating and transport device comprising:

a transportable frame body separate and independent of the escalator or moving walkway and including:

a plurality of support profiles coupled to one another; lateral guide tracks arranged to receive rollers connected to each of the steps of the step band or pallets of the pallet band when the steps or pallets are stacked inside the frame body for transport purposes, wherein the lateral guide tracks include two superposed guide tracks coupled to and extending between the support profiles on each side of the frame body, wherein the two superposed guide tracks on each side of the frame body include an upper guide track and an associated lower guide track; and a ramp on each side of the frame body coupled respectively to the upper guide track on each side of the frame body to form a supply and discharge area directed into a direction of the associated lower guide track on each side of the frame body.

2. An accommodating and transport device according to claim 1, wherein the steps or pallets are arranged in a vertical position when stacked inside the frame body.

3. An accommodating and transport device according to 1, wherein the frame body is configured to accommodate the step or pallet band, which band includes a complete number of steps or pallets required for an escalator or a moving walkway.

4. An accommodating and transport device according to claim 1, wherein the profiles of the frame body comprise coated, horizontally and vertically arranged steel or aluminium profiles.

5. An accommodating and transport device according claim 1, wherein the frame body is reusable.

6. A combination, comprising:

a prefabricated step band of an escalator or a prefabricated pallet band of a moving walkway; and an accommodating and transport device for the step band or the pallet band, the accommodating and transport device comprising:

a transportable frame body separate and independent of the escalator or moving walkway, wherein the frame body includes a plurality of support profiles coupled to one another, and lateral guide tracks coupled to and extending between the profiles on each side of the frame body, wherein each guide track receives a roller connected to each of the steps of the step band or pallets of the pallet band, and wherein the steps or pallets are arranged within the frame body as a continuous band and are transportable within the frame body to or away from an assembly area of the escalator or moving walkway.

7. The combination according to claim 6, wherein the step band or pallet band further includes a laterally arranged, continuous drive chain operatively coupled to the individual steps or pallets.

8. The combination according to claim 6, including a stop element located at least before a first step of the step band or a first pallet of the pallet band in the area of the frame body, as seen in a direction of the pallets or steps exiting the frame body, whereby the stop element secures the steps or pallets inside the frame body.

9. A method for accommodating and transporting prefabricated steps of an escalator or prefabricated pallets of a moving walkway, comprising:

connecting individual steps or pallets to at least one drive element to form a continuous step or pallet band;

inserting the step or pallet band into an accommodating and transport device such that the individual steps or pallets are stacked within the frame body closely adjacent to each other, the accommodating and transport device comprising a transportable frame body separate and independent of the escalator or moving walkway, wherein the frame body includes a plurality of support profiles coupled to one another, and lateral guide tracks coupled to and extending between the profiles on each side of the frame body, and wherein each guide track receives a lateral roller connected to each of the steps of the step band or pallets of the pallet band, whereby the step or pallet band is transportable within the frame body to an assembly area of the escalator or moving walkway.

10. The method of claim 9, and further including guiding the step or pallet band out of the frame body and inserting the step or pallet band into a base body of the escalator or the moving walkway in an assembly area of the escalator or moving walkway.

11. The method according to claim 10, wherein the frame body includes a supply and discharge area arranged on a side of the frame body, and wherein the inserting step is for the purpose of transporting the step or pallet band and the guiding out step is for the purpose of assembling an escalator or moving walkway, and the inserting and guiding out steps are performed via the supply and discharge area of the frame body.

12. The method according to claim 10, wherein, before the guiding out step, transporting the frame body with the individual steps or pallets stacked therein to the assembly area of the escalator or moving walkway.

13. The method according to claim 9, wherein the lateral guide tracks include superposed guide tracks, and the inserting step includes inserting the lateral rollers of the individual steps or pallets into the respective guide tracks of the frame body such that the individual steps or pallets are placed in a vertical, hanging position inside the frame body.

14. A combination comprising:

a continuous prefabricated step band of an escalator or a continuous prefabricated pallet band of a moving walkway, wherein each individual step or pallet includes lateral guide rollers, and wherein the step band or pallet band includes a laterally arranged, continuous drive chain operatively coupled to each individual step or pallet; and a device for accommodating and transporting the step band of the escalator or the pallet band of the moving walkway, the device comprising:

a transportable frame body separate and independent of the escalator or moving walkway, the frame body including:

a plurality of laterally spaced vertical profiles;

a plurality of laterally spaced horizontal profiles connecting the vertical profiles; and two superposed lateral guide tracks arranged on each side of the frame body and configured to receive the lateral guide rollers connected to each of the steps or pallets when the steps or pallets are stacked inside the frame body, wherein, when stacked inside the frame body, each individual step or pallet is arranged in a vertical position, and wherein the frame body with the step band or pallet band accommodated therein is transportable to an assembly area of the escalator or moving walkway.

* * * * *